United States Patent [19]

Bethe

[11] 3,718,417
[45] Feb. 27, 1973

[54] APPARATUS FOR MOLDING FOAM ARTICLES

[75] Inventor: Eugene J. Bethe, Mishawaka, Ind.
[73] Assignee: Uniroyal, Inc., New York, N.Y.
[22] Filed: April 9, 1971
[21] Appl. No.: 132,783

Related U.S. Application Data

[62] Division of Ser. No. 830,407, June 4, 1969.

[52] U.S. Cl. .......................425/406, 425/4, 264/46
[51] Int. Cl. ............................................B29d 27/04
[58] Field of Search ....18/5 P, 5 V, 5 D, 5 F; 264/45, 264/46, 321; 425/4, 406, 817

[56] References Cited

UNITED STATES PATENTS 3,393,258 7/1968 Fultz et al..............................264/45
3,378,885 4/1968 Dart.........................................18/5 P
3,264,282 8/1966 Angell et al. ...........................264/46

Primary Examiner—H. A. Kilby, Jr.
Attorney—Charles A. Blank

[57] ABSTRACT

In the manufacture of foam cushions having portions of different densities, a foam material of uniform density is poured in a fluid condition into a mold having an auxiliary cavity with a retractable lid which is in its retracted position at the time that the foam is poured. After the foam has gelled or partially cured to the point where it is no longer fluid, the lid is replaced to compress the foam in one portion of the cushion, thus increasing its local density. Thereafter the foam is fully cured and removed from the mold. The resulting product is an integrally molded cushion exhibiting portions of different density.

2 Claims, 6 Drawing Figures

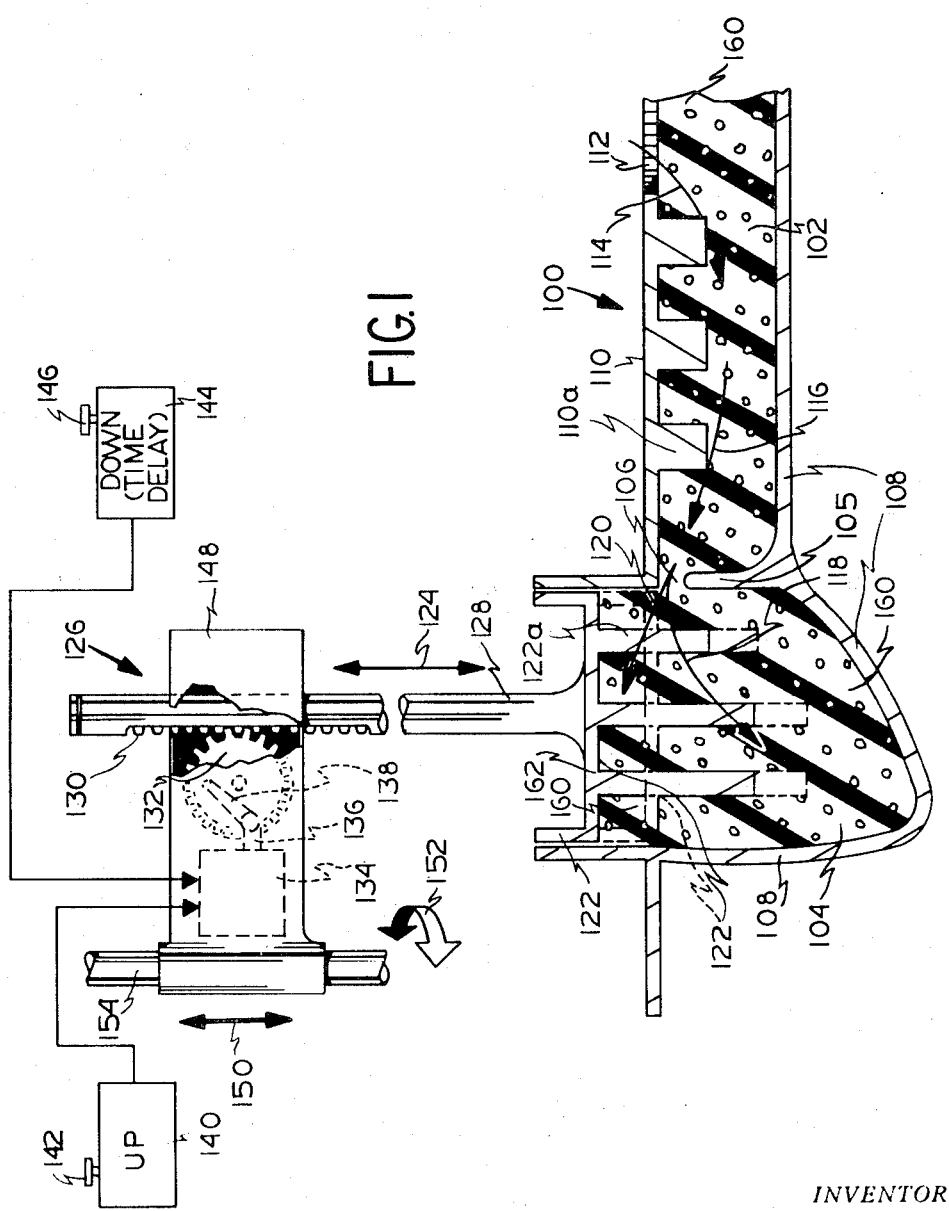

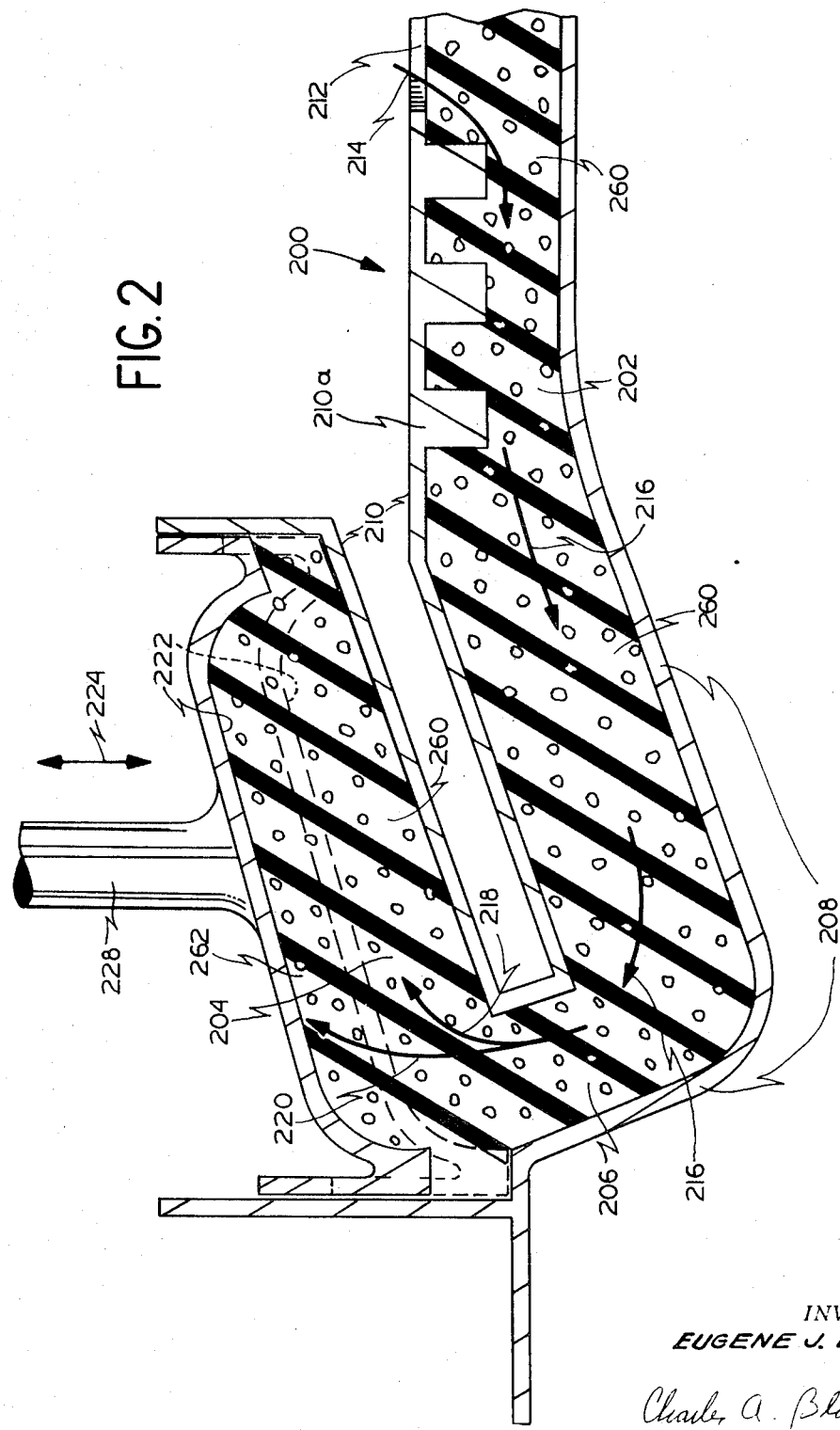

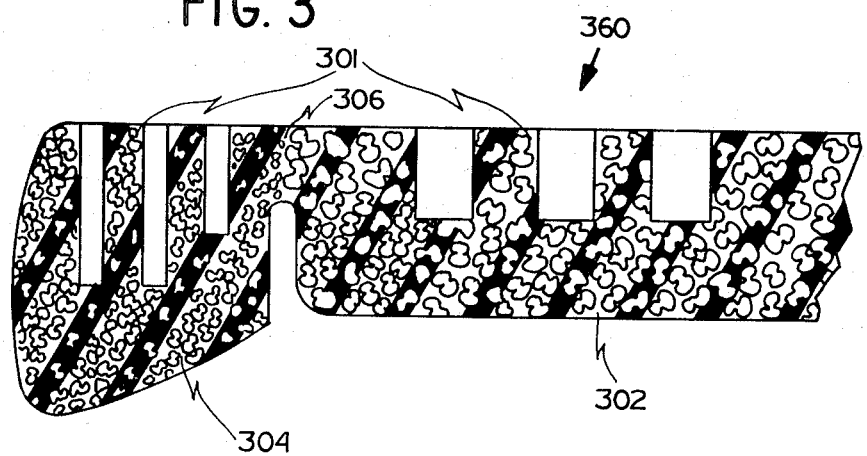
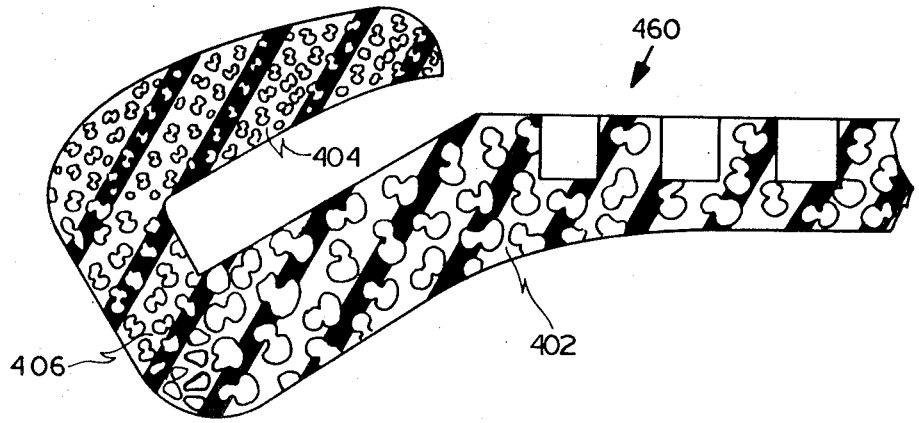

INVENTOR.
EUGENE J. BETHE

ATTORNEY

APPARATUS FOR MOLDING FOAM ARTICLES

This application is a division of my copending application Ser. No. 830,407, filed June 4, 1969.

FIELD OF THE INVENTION

This invention relates to molded foam articles, and to apparatus and a method for the manufacture of such articles. It is particularly concerned with multi-density foam articles having utility as automobile seat cushions.

THE PRIOR ART

There are certain applications in which there is a need for foam cushions having different densities in different regions. For example, as part of the recent emphasis on automobile safety, designers have put crash padding of a resilient nature over dash boards and other surfaces which passengers are likely to strike in the event of a crash or other sudden deceleration. One of the areas selected for such protection is the rear surface of the front seat, since padding in this area can prevent head injuries to rear seat passengers. One of the ways in which such crash padding can be provided is to form the front seat backrest cushion with an auxiliary portion which extends rearwardly and downwardly over the back of the front seat. In a cushion of this kind, the back rest portion should have a relatively low density for the comfort of the front seat passengers during normal riding, and a relatively high density in the crash pad area to provide an effective safety cushion.

Other types of automobile seat cushions which may require different densities in different areas are a seat bottom cushion formed with a raised margin to provide increased body support at the edges, and a seat back cushion of the semi-bucket design which is formed with a projecting marginal "wing" portion to provide a measure of lateral confinement on turns.

The methods and apparatus employed for manufacturing dual density foam seat cushions in the past have not been entirely satisfactory. In one such method the seat cushion was manufactured by separately molding the lower density portion of the cushion from a batch of low density foam material in one mold, and the higher density portion from a separate batch of high density foam material in a separate mold, after which the two portions were either cemented together or mounted in proximity but not attached to each other. The difficulty with the first approach is that the cement dries to a hard consistency which reduces the compressibility of the cushion and thus adversely affects its comfort for seating purposes. In addition the different density portions of the cushion have a tendency to come apart along the cement line, and once they separate they tend to rub against each other, becoming fragmented. The latter problem is also encountered when the two cushion portions are originally unattached but in proximity.

Another prior art method of fabrication is to mold the two cushion portions integrally with each other in the same mold, using a low density foam preparation for one portion of the cushion and a separate high density foam preparation poured into an adjoining region of the mold cavity to form the other portion of the cushion. The disadvantage of this approach is that in the end product the density transition boundary is quite jagged in shape and imprecisely located, due to the difficulty of controlling the junction of the two different fluid foam materials poured in contiguity with each other.

With either of the prior art methods cited, there is the necessity for preparing two different batches of foam having different densities, which is a considerable inconvenience in a production process.

SUMMARY AND OBJECTS OF THE INVENTION

It is therefore an object of the present invention to provide a multi-density foam article in which the different density portions are molded integrally with each other, using a single mold and a single uniform density batch of foam material. Another objective is to provide a multi-density foam cushion in which the boundary between two different density regions is smoothly shaped and precisely located.

Another objective of the invention is to provide an improved mold having a unique construction which permits one-shot molding of a cushion of this type, using a single foam preparation.

Another objective of the invention is to provide a molding method which uses a single mold and a single foam preparation to produce an end product of the kind described.

In carrying out the invention, a mold is provided which has a body cavity adapted to mold a body portion of the cushion, an auxiliary cavity which communicates with the body cavity and is adapted to mold an auxiliary portion of the seat cushion integrally therewith, and a retractable lid for the auxiliary cavity only. The cushion is fabricated by first retracting the auxiliary cavity lid, and then filling the mold with fluid foam material of substantially uniform density. Then the foam material is brought to a non-fluid state, after which the lid is replaced to compress the foam material in the auxiliary portion of the cushion only, thereby increasing its density locally. Then the foam material preferably is cured with the lid in place. The resulting product is a multi-density, integrally molded foam cushion.

BRIEF DESCRIPTION OF THE DRAWINGS

FIG. 1 is a partly mechanical and partly schematic view of molding apparatus in accordance with this invention, including a vertical section of a mold.

FIG. 2 is a similar partly schematic vertical section of another mold in accordance with this invention, for forming a differently shaped foam cushion product.

FIG. 3 is a partly schematic sectional view of a multi-density cushion formed with the molding apparatus of FIG. 1.

FIG. 4 is a similar partly schematic sectional view of a multi-density foam cushion formed with the molding apparatus of FIG. 2.

The same reference characters refer to the same elements throughout the several views of the drawing.

DETAILED DESCRIPTION OF THE PREFERRED EMBODIMENTS

Figure 5:
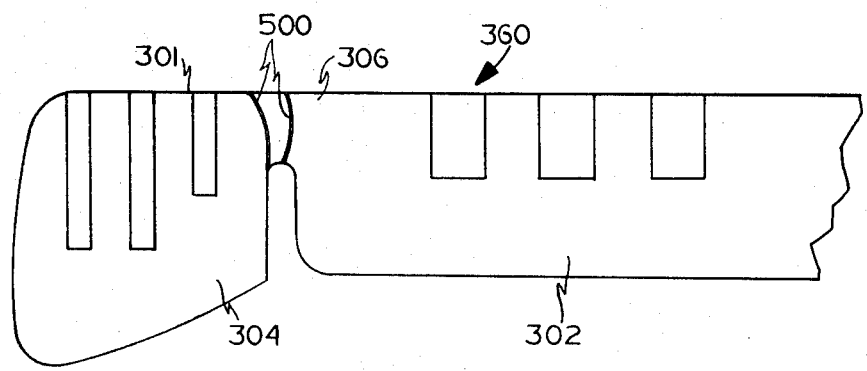
FIG. 5 is a partly schematic sectional view of the cushion of FIG. 3 showing the approximate pattern of iso-density lines therein.

The molding apparatus of this invention includes a mold 100 which is divided into a body cavity 102 and an auxiliary cavity 104 connected thereto by a passage 106. This form of mold is adapted for the production of a foam cushion having a body portion (formed in the cavity 102) and an auxiliary portion (formed in the cavity 104) which are integral with each other. A member 108 forms the bottom and side walls of the body cavity 102 and auxiliary cavity 104, and includes the partition 105 which partially separates the cavities. A top plate 110 forms the top wall of the body cavity 102 only, and is formed with an opening 112 through which raw foam material in liquid form may be poured. The poured foam material enters the opening 112 and body cavity 102 as shown by arrow 114, after which it spreads through the body cavity 102 as shown by arrow 116 and passes through passage 106 and into the auxiliary cavity 104 as shown by arrows 118 and 120. Suitable cores 110a of conventional construction are attached to top plate 110.

In accordance with this invention, for the purpose of achieving a local region of higher density in the auxiliary cavity 104 only, the latter cavity is provided with its own retractable lid 122 which may be raised and lowered (arrows 124) by means of a mechanism generally designated 126. Suitable cores 122a of conventional construction are attached to top plate 122.

The lid actuating mechanism 126 may take any form, and may be actuated either manually or with any desired degree of automation. Preferably, for the purpose of simplicity, the auxiliary cavity lid 122 can be actuated and controlled manually by, for example, a suitable lever arm and latch (not shown). In the particular example of FIG. 1, on the other hand, the lid actuating mechanism 126 includes a vertical actuating rod 128 formed with toothed rack 130 which cooperates with pinion 132 to raise and lower the lid 122 as required. A solenoid 134 drives the pinion 132 by means of an armature 136 and crank linkage 138. A circuit 140 is provided with a manual push button 142 by means of which solenoid 134 can be energized to raise the lid 122, while a time delay circuit 144 is provided with a manual push button 146 which starts the time interval. At the expiration of that interval, the delay circuit 144 provides an output to the solenoid 134 which causes it to drive the lid 122 downwardly. The lid actuating mechanism 126 is contained in a housing 148 which is mounted for vertical movement (arrows 150) and rotation (arrows 152) upon a supporting post 154. This permits the entire actuating mechanism 126 to be raised and rotated away from the mold 100 when necessary.

The actuating mechanism 126 is designed to move the auxiliary cavity lid 122 between raised and lowered positions indicated by the solid and dashed lines respectively when using the apparatus of FIG. 1 to practice the molding process of this invention. The top plate 110 of the mold assembly 100 is first put in place over the bottom and side wall member 108. The mechanism 126 is adjusted so that lid 122 is over the auxiliary cavity 104, but is held initially at its raised position indicated by the solid lines. Then a liquid raw foam material 160 is poured into the mold 100 through the top plate opening 112. The liquid material 160 follows the path indicated by arrows 114 through 118 to fill up the body cavity 102, passage 106 and auxiliary cavity 104 in that order. In addition, as indicated by arrow 120, the foam material 160 fills the upper region 162 which constitutes the extra space at the top of auxiliary cavity 104 provided by the raising of lid 122 from its dashed line position to its solid line position.

Note that the material 160 is a single batch of foam having a uniform density throughout the mold regions 102, 106, 104 and 162. It may be a conventional foam molding material now used in the industry; for example, liquid latex whipped either with air or with a soap lather to form a frothy but pourable mixture. It may also be some other substance which is normally foamed in place instead of prior to pouring. The requirements are first, that the foam material must first reach all regions of the mold; second, that after the passage of time it must reach a state in which it is no longer fluid; third, the gelled foam must be strong enough to withstand the compressive step without tearing or rupturing; and fourth, the gelled foam must be capable of being formed. These requirements are met by a number of curable foam materials which can be gelled, partially cured, or otherwise brought to a plastic but non-fluid state prior to compression and complete curing, and therefore can be utilized in the process of this invention.

After the foam material 160 has arrived at a non-fluid condition, the auxiliary cavity lid 122 is lowered from the solid line to the dashed line position of FIG. 1. This can be done using the lid actuating mechanism 126 or any comparable apparatus. If an automatic time delay mechanism such as circuit 144 is employed, the circuit is adjusted to have a time delay which matches the gelling or partial curing time of the particular foam material employed. Then all that is necessary is to actuate the manual button 146 at the time that the molding material 160 is poured or foamed, after which the circuit 144 will cause the mechanism to lower the lid 122 at the end of the proper time interval.

When lowered, the lid 122 comes down to a position in which it may be flush with top plate 110 of the body cavity 102, to form a continuous top surface for the foam cushion. It does so, however, by compressing the material 160 which is in the mold regions 104 and 162. Specifically, the material 160 which originally occupied regions 162 and 104 must now be compressed into auxiliary cavity 104 alone. This results in a substantial increase in density throughout the auxiliary cavity 104 and extending into the passageway 106 and a small distance into the body cavity 102. However, the region of compression and of increased density does not extend very far into the body cavity 102, because of the fact that the material 160 is allowed to reach a non-fluid state before the compressive force is exerted. As a result, the compressive forces can not be distributed uniformly throughout the body of material 160.

The lid 122 may also be lowered to a position in which it is above or below top plate 110. In that case a continuously flush top surface is not provided for the foam cushion, but a substantial increase in foam density in auxiliary cavity 104 is obtained nevertheless.

Subsequently the material 160 is allowed to cure completely while the auxiliary cavity lid 122 preferably is left in the lower position (represented by the dashed lines of FIG. 1) for best dimensional stability of the cushion. However, with some foam materials the lid 122 may be raised prior to complete curing. In either case, the compressed portion of the material 160 remains in the compressed state during curing, so that it retains its greater density. Then the cured cushion is extracted from the mold 100 by lifting the top plate 110 and lid 122 together. The foam cushion adheres to the lid 122 and top plate 110, and may then be stripped therefrom, washed and dried.

The end product, as seen in FIG. 3, is a foam cushion 360 having a body portion 302 which is of normal density and an auxiliary portion 304 which is of substantially higher density and is integrally molded with the body portion 302. The region near the connecting web 306 between the two different density portions contains some material of higher density than the body portion 302. The form of the cushion 360 is such that the less dense body portion 302 forms a soft and therefore comfortable back rest or bottom cushion for an automobile seat, while the auxiliary portion 304 is a denser wing portion providing greater body support or lateral confinement, depending upon the application. The surface 301 of the cushion is a flat surface defined by the flush relationship between the body cavity top plate 110 and the auxiliary cavity lid 122 of FIG. 1 when the lid is in its lower or dashed line position.

In FIG. 2 there is seen a different form of mold useful in the manufacture of a different auto seat cushion. Here the mold 200 includes a member 208 forming the bottom and side walls of a body cavity 202 and an auxiliary cavity 204 connected by a passage 206. A top plate 210 having cores 210a thereon forms the top wall of the body cavity 202 as well as the bottom wall of the auxiliary cavity 204, and is also formed with an opening 212 through which foam material 260 can be poured as indicated by arrow 214. The poured material spreads through the body cavity 202 as indicated by arrows 216, and through the passage 206 into the auxiliary cavity 204 as indicated by arrow 218.

In the use of this mold embodiment, once again, the foam is poured with the auxiliary cavity lid 222 raised by means of an actuating shaft 228 and an appropriate actuating mechanism (not shown). The latter may be similar to the mechanism 126 of FIG. 1, or it may be manually actuated and controlled by, for example, a suitable lever arm and latch. Accordingly, as shown by arrow 220, the liquid foam material 260 enters the extra space 262 which is provided at the top of the auxiliary cavity 204 by the raising of the lid 222. Then the foam material 260 is allowed to gel or cure partially until it reaches a non-fluid condition, after which the rod 228 lowers the lid 222 to compress the foam material locally. Afterwards the foam preferably is allowed to cure completely with the lid 222 lowered and is then removed from the mold 200. The latter step is accomplished by removing the rod 228 and auxiliary cavity lid 222, as well as the top plate 210. The foam cushion adheres to the top plate 210 upon removal, may then be stripped from the top plate, washed and dried.

The result, as seen in FIG. 4, is a foam cushion 460 having a body portion 402 of relatively low density which forms a seat-back cushion for an automobile seat, and an auxiliary portion 404 of higher density which is integrally molded therewith. The material at connecting portion 406 is of intermediate density. When the cushion is installed in an automobile seat, the low density portion 402 forms a back cushion which is soft enough to provide comfort to the occupants of the front seat, and the high density portion 404 extends down over the rear surface of the front seat to provide a high density crash pad which protects a rear seat passenger from head injuries in the event that he is thrown forward.

It will now be appreciated that either foam cushion 360 or 460 need not be formed of two separate parts, or molded in two separate molds, or of two separate foam preparations. Consequently, there is no need for multiple molds and multiple foam formulations, no cement line to affect the softness and comfort of the cushion, no risk that the cement will deteriorate and allow the parts to separate, and no risk that separate but contiguous parts of the cushion will frictionally abrade each other due to their relative motion.

Figure 6:
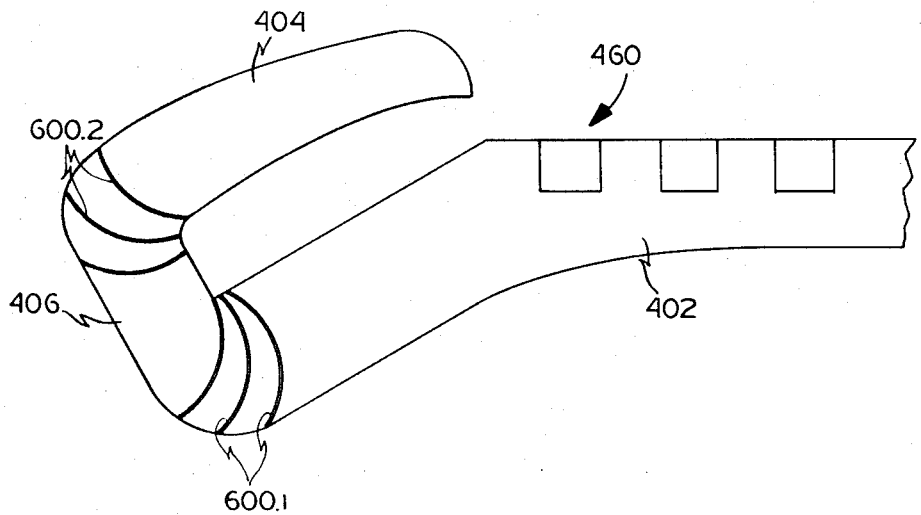
FIG. 6 is a partly schematic sectional view of the cushion of FIG. 4, again showing the approximate locations of iso-density lines therein.

FIGS. 5 and 6 illustrate the nature of the density transition by means of iso-density lines 500 and 600, i.e., lines which connect points of like density throughout the volume of the seat cushions 360 and 460 respectively. The density is nearly uniformly high in the auxiliary portion 304 of seat cushion 360, and nearly uniformly low in the body portion 302. Note that the boundary zone between the two portions 304 and 302, which is indicated by the iso-density lines 500, is smooth and precisely located between the two portions 302 and 304, rather than being jagged in shape and extending partly into the portions 302 and 304 at random locations as is the case when two different density foam liquids form an interpenetrating boundary. Similarly, in FIG. 6 the density in the auxiliary crash pad portion 404 of cushion 460 is high, while that of body portion 402 is low. The connecting portion 406 is a region of uniform intermediate density between the densities of portions 402 and 404. The boundary zones between the intermediate density region and the two other regions are indicated by two groups of iso-density lines 600.1 and 600.2, and are seen to be smooth and precisely located between region 406 and regions 402 and 404 respectively. The first-mentioned boundary is further indicated by some elliptically shaped cells which appear at the boundary between portions 402 and 406.

Thus the invention provides an improved integrally molded foam article having particular utility for automobile seat cushions, as well as a convenient molding method and apparatus by which such a cushion can be fabricated using a single, uniform density foam formulation.

While there have been described what are at present considered to be the preferred embodiments of this invention, it will be obvious to those skilled in the art that various changes and modifications may be made therein without departing from the invention, and it is, therefore, intended to cover all such changes and modifications as fall within the true spirit and scope of the invention.

Having thus described my invention, what I claim and desire to protect by Letters Patent is:

1. Apparatus for molding a foam article having a first portion of one density and a second portion of higher density integrally molded therewith comprising:
a first mold cavity adapted to mold said first portion;
a second mold cavity communicating with said first cavity and adapted to mold said second portion integrally with said first portion;
and a mold closure member cooperating to form said second cavity only, said member being displaceable from a position closing said second cavity to a position diminishing the volume of said second cavity only and thus compressing said second portion of said article.

2. Apparatus as in claim 1 in which said first mold cavity is a body cavity and said second mold cavity is an auxiliary cavity.

* * * * *